(12) United States Patent
Wang et al.

(10) Patent No.: US 12,469,842 B2
(45) Date of Patent: Nov. 11, 2025

(54) NEGATIVE ELECTRODE MATERIAL, NEGATIVE ELECTRODE PLATE, ELECTROCHEMICAL APPARATUS, AND ELECTRONIC APPARATUS

(71) Applicant: Ningde Amperex Technology Limited, Ningde (CN)

(72) Inventors: Chao Wang, Ningde (CN); Ting Zhang, Ningde (CN); Daoyi Jiang, Ningde (CN); Hang Cui, Ningde (CN)

(73) Assignee: NINGDE AMPEREX TECHNOLOGY LIMITED, Ningde (CN)

(*) Notice: Subject to any disclaimer, the term of this patent is extended or adjusted under 35 U.S.C. 154(b) by 547 days.

(21) Appl. No.: 17/957,179

(22) Filed: Sep. 30, 2022

(65) Prior Publication Data

US 2023/0042519 A1    Feb. 9, 2023

Related U.S. Application Data

(63) Continuation of application No. PCT/CN2020/082266, filed on Mar. 31, 2020.

(51) Int. Cl.
*H01M 4/36*      (2006.01)
*H01M 4/02*      (2006.01)
(Continued)

(52) U.S. Cl.
CPC .......... *H01M 4/364* (2013.01); *H01M 4/386* (2013.01); *H01M 4/583* (2013.01); *H01M 4/622* (2013.01);
(Continued)

(58) Field of Classification Search
None
See application file for complete search history.

(56) References Cited

U.S. PATENT DOCUMENTS

8,053,113 B2 *   11/2011   Oh .................. H01M 4/621
                                                                                           429/232
2013/0177807 A1    7/2013   Lee et al.
(Continued)

FOREIGN PATENT DOCUMENTS

CN          101439972 A      5/2009
CN          102487139 A      6/2012
(Continued)

OTHER PUBLICATIONS

CN-104327762-A English machine translation (Year: 2015).*
(Continued)

*Primary Examiner* — Scott J. Chmielecki
(74) *Attorney, Agent, or Firm* — WHDA, LLP (57) ABSTRACT

A negative electrode material includes a composite of a silicon-based material (1), a polymer (2), and carbon nanotubes (3), where the polymer (2) contains a first group and a second group, the first group is chemically bonded to the carbon nanotubes (3), and the second group is chemically bonded to the silicon-based material (1). Both the carbon nanotubes (3) and the polymer (2) containing two groups are applied to surfaces of particles of the silicon-based material (1). The two groups of the polymer (2) are chemically bonded to the silicon-based material (1) and the carbon nanotubes (3) respectively, so that bonding force between the silicon-based material (1) and the carbon nanotubes (3) is enhanced and a uniform carbon nanotube (3) coating layer is formed. This can significantly improve conductive performance of the silicon-based material (1), thereby improving cycling performance and rate performance of an electrochemical apparatus.

16 Claims, 3 Drawing Sheets

(51) Int. Cl.
*H01M 4/38* (2006.01)
*H01M 4/583* (2010.01)
*H01M 4/62* (2006.01)
*H01M 50/46* (2021.01)

(52) U.S. Cl.
CPC ...... *H01M 50/46* (2021.01); *H01M 2004/028* (2013.01)

(56) References Cited

U.S. PATENT DOCUMENTS

| | | | |
|---|---|---|---|
| 2014/0072871 | A1 | 3/2014 | Chen et al. |
| 2018/0261402 | A1* | 9/2018 | Manabe ............... H01M 4/625 |
| 2018/0294477 | A1* | 10/2018 | Shin .................... H01M 4/5825 |
| 2019/0006676 | A1* | 1/2019 | Daughenbaugh ........................... H01M 10/0525 |
| 2019/0237753 | A1 | 8/2019 | Ren et al. |
| 2020/0131379 | A1* | 4/2020 | Himizu ............... C09D 129/04 |
| 2020/0280061 | A1 | 9/2020 | Deng et al. |
| 2021/0075003 | A1* | 3/2021 | Yasuda ................. H01M 4/483 |
| 2021/0355257 | A1* | 11/2021 | Daigle .................. H01M 4/386 |
| 2022/0052320 | A1 | 2/2022 | Chen et al. |

FOREIGN PATENT DOCUMENTS

| | | | |
|---|---|---|---|
| CN | 104327762 | A * | 2/2015 |
| CN | 105609743 | A | 5/2016 |
| CN | 105762364 | A | 7/2016 |
| CN | 105789576 | A | 7/2016 |
| CN | 105977463 | A | 9/2016 |
| CN | 104885269 | B | 4/2017 |
| CN | 108054368 | A | 5/2018 |
| CN | 108232173 | A | 6/2018 |
| CN | 109301184 | A | 2/2019 |
| CN | 109980199 | A | 7/2019 |
| CN | 110797520 | A | 2/2020 |
| IN | 103199257 | A | 7/2013 |

OTHER PUBLICATIONS

Chinese Office Action dated Jun. 30, 2022 issued in counterpart CN Patent Application No. 202080030144.5.
International Search Report dated on Jan. 5, 2021, issued in counterpart International Application PCT/CN2020/082266.
Office Action dated Jan. 18, 2023, issued in counterpart CN Application No. 202080030144.5. (7 pages).
Extended (Supplementary) European Search Report dated Jun. 22, 2023, issued in counterpart EP Application No. 20928837.2. (7 pages).

* cited by examiner

NEGATIVE ELECTRODE MATERIAL, NEGATIVE ELECTRODE PLATE, ELECTROCHEMICAL APPARATUS, AND ELECTRONIC APPARATUS

CROSS REFERENCES TO RELATED APPLICATIONS

The present application is a continuation application of PCT application PCT/CN2020/082266, filed on Mar. 31, 2020, the disclosure of which is hereby incorporated by reference in its entirety.

TECHNICAL FIELD

This application relates to the field of electronic technologies, and in particular, to a negative electrode material, a negative electrode plate, an electrochemical apparatus, and an electronic apparatus.

BACKGROUND

With a theoretical specific capacity of up to 4200 mAh/g, silicon-based materials are promising negative electrode materials for next-generation electrochemical apparatuses (such as lithium-ion batteries). However, during charging and discharging, the silicon-based material experiences a volume swelling of about 300%, and an unstable solid electrolyte interface film (SEI, solid electrolyte interface) is formed on its surface, which all affect performance of the electrochemical apparatuses.

To alleviate volume swelling and improve conductive performance of the silicon-based materials, carbon nanotubes can be used to coat the silicon-based materials. However, an existing carbon nanotube coating solution is unsatisfactory.

SUMMARY

In view of the foregoing shortcomings of the prior art, this application uses a polymer containing two groups to improve bonding between a silicon-based material and carbon nanotubes.

This application provides a negative electrode material, including a composite of a silicon-based material, a polymer, and carbon nanotubes, where the polymer contains a first group and a second group, the first group is chemically bonded to the carbon nanotubes, and the second group is chemically bonded to the silicon-based material.

In the negative electrode material, the carbon nanotubes are present on a surface of the silicon-based material.

In the negative electrode material, the first group includes at least one of epoxy group, phenolic hydroxyl group, phenylamino group, phenyl group, naphthyl group, anthranyl group, phenanthryl group, phenyl ether group, pyrrole, pyridine, or furan.

In the negative electrode material, the second group includes at least one of carboxyl group, hydroxyl group, phenolic hydroxyl group, aldehyde group, acylamino group, acyl halide group, ester group, carbonyl group, or halogenated alkyl group.

In the negative electrode material, a mass percentage of the polymer in the composite is 0.5%-10%.

In the negative electrode material, a mass percentage of the carbon nanotubes in the composite is 0.5%-10%.

In the negative electrode material, a mass ratio of the silicon-based material to the polymer to the carbon nanotubes in the composite is 85-96.5:0.5-10:0.5-10.

In the negative electrode material, in an X-ray diffraction pattern, a highest intensity value of the silicon-based material is $I_1$ when $2\theta$ is in the range of 20.5° to 21.5°, and the highest intensity value is $I_2$ when $2\theta$ is in the range of 28.0° to 29.0°, where $0 < I_2/I_1 \le 3$.

In the negative electrode material, the negative electrode material is further doped with at least one of element lithium, magnesium, titanium, or aluminum.

This application further provides a negative electrode plate, including a current collector and an active substance layer provided on the current collector, where the active substance layer includes the negative electrode material in any one of the foregoing embodiments.

This application further provides an electrochemical apparatus, including a positive electrode plate, a negative electrode plate, and a separator disposed between the positive electrode plate and the negative electrode plate, where the negative electrode plate is the foregoing negative electrode plate.

This application further provides an electronic apparatus, including the foregoing electrochemical apparatus.

In this application, both carbon nanotubes and a polymer containing two groups are applied to surfaces of particles of a silicon-based material. The two groups of the polymer are chemically bonded to the silicon-based material and the carbon nanotubes respectively, so that bonding force between the silicon-based material and the carbon nanotubes is enhanced and a uniform carbon nanotube coating layer is formed. This can significantly improve conductive performance of the silicon-based material, thereby improving cycling performance and rate performance of an electrochemical apparatus.

DETAILED DESCRIPTION

The following embodiments may help persons skilled in the art to understand this application more comprehensively, but impose no limitation on this application in any manner.

Currently, to improve cycling stability and rate performance of an electrochemical apparatus using a silicon-based material as a negative electrode material, a porous silicon-based material may be used. To reduce a size of the silicon-based material, polymer coating, oxide coating, carbon material coating, or the like may be used, among which polymer coating has poorer conductive performance and larger impedance. Carbon material coating is an important means. Due to good mechanical performance (with a tensile intensity of up to 200 GPa, 100 times that of steel; and an elastic modulus of up to 1 TPa, about 5 times that of steel) and good conductive performance (with a conductivity that can generally reach 10,000 times that of steel), carbon nanotubes can be used as an excellent coating material for the silicon-based material. Carbon nanotube coating, as a widely used technology in recent years, not only alleviates volume swelling of the silicon-based material, but also significantly improves conductive performance of the silicon-based material. However, a surface bonding force between highly conductive carbon nanotubes and the silicon-based material is weak in the absence of direct bonding between them. In addition, because agglomeration of the carbon nanotubes leads to poor dispersibility, it is difficult to form a uniform carbon nanotube coating layer on a surface of the silicon-based material. Therefore, a conductive network structure, rather than uniform and effective coating, can be formed by adding carbon nanotubes into a silicon-based material.

In some existing solutions, carboxymethyl cellulose is used to disperse carbon nanotubes on a surface of a silicon-based material. However, bonding force between carboxymethyl cellulose and carbon nanotubes is weak in the absence of direct chemical bonding between them.

In this application, both carbon nanotubes and a polymer containing two groups are applied to surfaces of particles of a silicon-based material. The two groups of the polymer are chemically bonded to the silicon-based material and the carbon nanotubes respectively, so that bonding force between the silicon-based material and the carbon nanotubes is enhanced and a uniform carbon nanotube coating layer is formed. This can significantly improve conductive performance of a silicon-based negative electrode material, thereby improving cycling performance and rate performance of an electrochemical apparatus.

Figure 1:
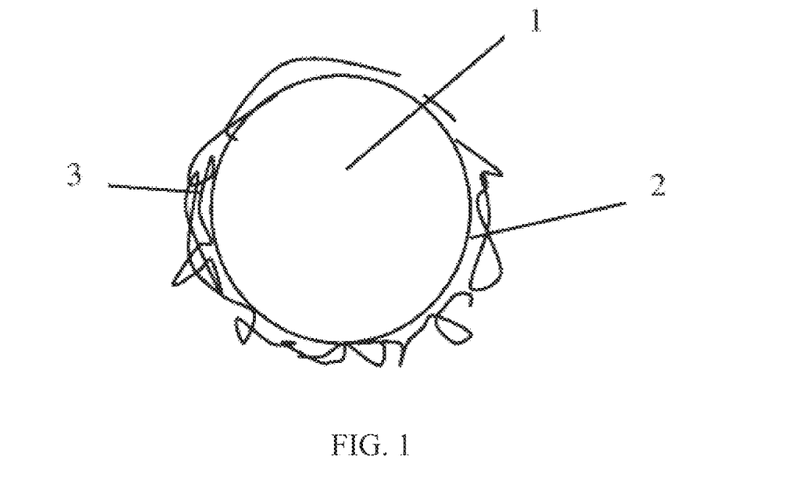
FIG. 1 is a schematic diagram of a negative electrode material according to this application.

As shown in FIG. 1, some embodiments of this application provide a negative electrode material, and the negative electrode material includes a composite of a silicon-based material 1, a polymer 2, and carbon nanotubes 3. In some embodiments, the polymer 2 contains a first group and a second group, the first group is chemically bonded to the carbon nanotubes 3, and the second group is chemically bonded to the silicon-based material 1. The chemical bonding between the first group and the carbon nanotubes 3 enhances bonding force between the polymer 2 and the carbon nanotubes 3, so that bonding force between the silicon-based material and the carbon nanotubes 3 is enhanced and a uniform carbon nanotube coating layer is formed. This improves conductive performance of the silicon-based material, thereby improving cycling performance and rate performance of an electrochemical apparatus.

In some embodiments, the silicon-based material includes at least one of silicon nanoparticles, silicon monoxide, or silicon-carbon composite particles. In some embodiments, the silicon-based material includes at least one of silicon, silicon oxygen, silicon carbon, or silicon alloy. In some embodiments, the silicon-based material may contain element lithium, magnesium, titanium, aluminum, or the like. These doping metal elements can improve conductive performance of the negative electrode material, first-cycle coulombic efficiency of a battery, and cycling performance and DCR (Directive Current Resistance, directive current resistance) of an electrochemical apparatus. In some embodiments, an average particle size of silicon-based particles is 500 nm-30 μm, where nano-silicon crystal grains are less than 100 nm in size. If an average particle size of the silicon-based material is excessively small, the silicon-based material is prone to agglomeration, and a large specific surface area consumes more electrolytes to form an SEI film. An excessively large average particle size of the silicon-based material does not help suppress volume swelling of the silicon-based material, but easily deteriorates conductive performance of an active substance layer. In addition, the excessively large average particle size of the silicon-based material reduces strength of a negative electrode plate. In some embodiments, a particle size of Si is less than 100 nm.

Figure 4:
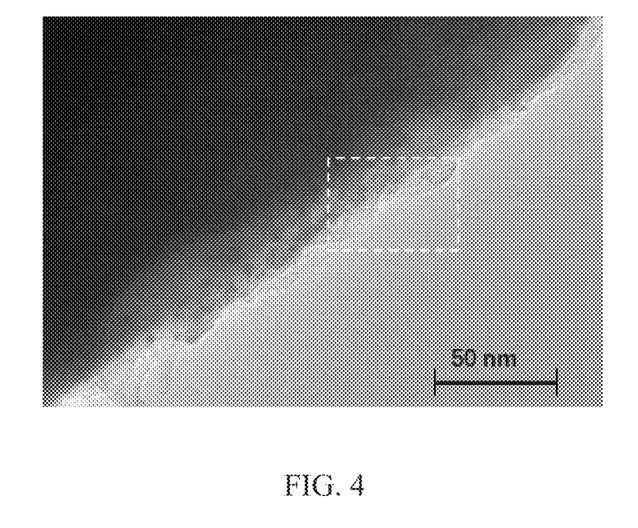
FIG. 4 is a transmission electron microscopy (TEM) image of a silicon-based material coated with carbon nanotubes and a polymer.

In some embodiments, the polymer 2 bridges the silicon-based material 1 and the carbon nanotubes 3. In some embodiments, the carbon nanotubes 3 are present on a surface of the silicon-based material 1. As shown in FIG. 4, FIG. 4 is a TEM image of a silicon-based material bridged to carbon nanotubes through a polymer, where the carbon nanotubes are shown in a dashed-line box. In some embodiments, the silicon-based material 1 is silicon-based particles, and the carbon nanotubes 3 are bridged to the silicon-based material 1 through the polymer 2 and coat the surface of the silicon-based material 1. The polymer 2 enhances bonding force between the silicon-based material 1 and the carbon nanotubes 3, and improves uniform dispersibility of the carbon nanotubes 3 on the surface of the silicon-based material 1, preventing the carbon nanotubes 3 from agglomerating on the surface of the silicon-based material 1. In some embodiments, the carbon nanotubes may include at least one of Li, Na, K, or other alkali metal ions. In some embodiments, the carbon nanotubes include single-walled carbon nanotubes, multi-walled carbon nanotubes, or a combination thereof In some embodiments, a diameter of the carbon nanotube is 1 nm-30 nm, with a length-diameter ratio of 50 to 30000.

In some embodiments, the first group includes at least one of epoxy group, phenolic hydroxyl group, phenylamino group, phenyl group, naphthyl group, anthranyl group, phenanthryl group, phenyl ether group, pyrrole, pyridine, or furan. In some embodiments, the second group includes at least one of carboxyl group, hydroxyl group, phenolic hydroxyl group, aldehyde group, acylamino group, acyl halide group, ester group, carbonyl group, or halogenated alkyl group. The first group facilitates chemical bonding between the polymer and the carbon nanotubes, and the second group facilitates chemical bonding between the polymer and the silicon-based material.

In some embodiments, a mass percentage of the polymer in the composite is 0.5%-10%. An excessively low percentage of the polymer cannot effectively enhance bonding between particles of the silicon-based material and the carbon nanotubes, such that electronic conductivity of the negative electrode material and the cycling performance and directive current resistance (DCR) of the electrochemical apparatus cannot be effectively improved. An excessively high percentage of the polymer can effectively enhance the bonding between the particles of the silicon-based material and the carbon nanotubes through the two groups of the polymer, but reduces the electronic conductivity of the negative electrode material due to poor conductive performance of the polymer, further affecting the cycling performance and directive current resistance (DCR) of the electrochemical apparatus. In some embodiments, thickness of a polymer layer is 5 nm-200 nm.

In some embodiments, a mass percentage of the carbon nanotubes in the composite is 0.5%-10%. When a percentage of the carbon nanotubes is excessively low, the conductive performance of the silicon-based material cannot be effectively improved. When the percentage of the carbon nanotubes is excessively high, a carbon nanotube coating layer is too thick, which is not conducive to migration of lithium ions, thereby deteriorating the cycling performance of the electrochemical apparatus.

In some embodiments, a mass ratio of the silicon-based material to the polymer to the carbon nanotubes in the composite is 85-96.5:0.5-10:0.5-10. An appropriate ratio of materials can effectively overcome the problems of poor conductive performance and large volume swelling of the silicon-based material while exerting the advantage of high specific capacity of the silicon-based material, thereby improving cycling performance and rate performance of a formed electrochemical apparatus.

In some embodiments, in an X-ray diffraction pattern, a highest intensity value of the silicon-based material is $I_1$ when $2\theta$ is in the range of 20.5° to 21.5°, and the highest intensity value is $I_2$ when $2\theta$ is in the range of 28.0° to 29.0°, where $0<I_2/I_1 \leq 3$. A value of $I_2/I_1$ reflects to what extent the silicon-based material is affected by disproportionation. A larger value of $I_2/I_1$ means larger nano silicon-based crystal grains generated by SiO disproportionation generated in the silicon-based material, which leads to sharply increased stress on some regions during lithiation, thereby causing structural damage to the silicon-based material during cycling.

In some embodiments, the negative electrode material is further doped with at least one of element lithium, magnesium, titanium, or aluminum. In some embodiments, the negative electrode material being doped with metal elements can improve the conductive performance of the negative electrode material, the first-cycle coulombic efficiency of the battery, and the cycling performance and DCR of the electrochemical apparatus. In some embodiments, a specific surface area of the negative electrode material is 1 $m^2/g$-50 $m^2/g$.

In some embodiments, the negative electrode material may be prepared by using the following methods: 0.5 g-15 g of carbon nanotube (CNT) powder is added into a solvent containing 0.5 g-20 g polymer, and the mixture is dispersed for 1 h-24 h to obtain a CNT slurry; 100 g of silicon-based material powder is added into the CNT slurry, and the mixture is stirred at a rotation speed of 300 r/min to 2500 r/min and dispersed for 2 h-4 h to obtain a mixed slurry; the mixed slurry is dried, and the solvent in the mixed slurry is removed to obtain a composite; and the composite is mechanically crushed and sieved with a 400-mesh sieve to obtain a negative electrode material, that is, a silicon-based material coated with CNT and a polymer. The solvent in the foregoing preparation process may be at least one of water, ethanol, methanol, n-hexane, N,N-dimethylformamide, pyrrolidone, acetone, toluene, isopropanol, or n-propyl alcohol. In addition, drying may be rotary evaporation, spray drying, filtration, freeze drying, or the like.

Figure 2:
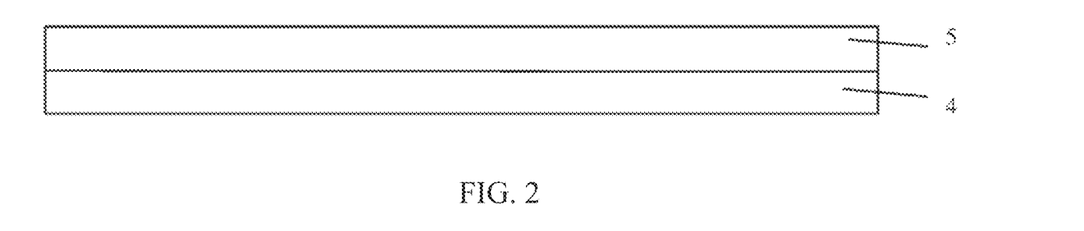
FIG. 2 is a schematic diagram of a negative electrode plate according to this application.

As shown in FIG. 2, some embodiments of this application provide a negative electrode plate, and the negative electrode plate includes a current collector 4 and an active substance layer 5. The active substance layer 5 is provided on the current collector 4. It should be understood that, although the active substance layer 5 is provided on one side of the current collector 4 in FIG. 2, this is only an example, and the active substance layer 5 may be provided on two sides of the current collector 4. In some embodiments, the current collector of the negative electrode plate may include at least one of copper foil, aluminum foil, nickel foil, or a carbon-based current collector. In some embodiments, the active substance layer 5 includes the foregoing negative electrode material.

In some embodiments, the active substance layer further includes a carbon material, a conductive agent, and a binder. In some embodiments, the carbon material includes graphite, graphene, or the like. In some embodiments, the binder may include at least one of carboxymethyl cellulose (CMC), polyacrylic acid, polyvinylpyrrolidone, polyaniline, polyimide, polyamideimide, polysiloxane, polystyrene-butadiene rubber, epoxy resin, polyester resin, polyurethane resin, or polyfluorene. In some embodiments, a mass percentage of the binder in the active substance layer is 0.5%-10%. In some embodiments, the conductive agent includes at least one of single-walled carbon nanotubes, multi-walled carbon nanotubes, vapor grown carbon fiber, conductive carbon black, acetylene black, Ketjen black, conductive graphite, or graphene. In some embodiments, a mass percentage of the conductive agent in the active substance layer is 0.1%-5%.

Figure 3:
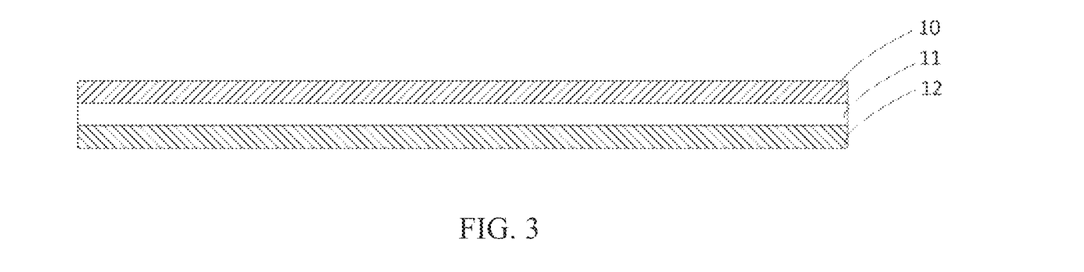
FIG. 3 is a schematic diagram of an electrode assembly of an electrochemical apparatus according to this application.

As shown in FIG. 3, some embodiments of this application provide an electrochemical apparatus, and the electrochemical apparatus includes a positive electrode plate 10, a negative electrode plate 12, and a separator 11 disposed between the positive electrode plate 10 and the negative electrode plate 12. The positive electrode plate 10 may include a positive electrode current collector and a positive electrode active substance layer applied on the positive electrode current collector. In some embodiments, the positive electrode active substance layer may be applied on only part of the positive electrode current collector. The positive electrode active substance layer may include a positive electrode active substance, a conductive agent, and a binder. The positive electrode current collector may be Al foil, or may be another positive electrode current collector commonly used in the art. The conductive agent in the positive electrode plate may include at least one of conductive carbon black, lamellar graphite, graphene, or carbon nanotubes. The binder in the positive electrode plate may include at least one of polyvinylidene fluoride, vinylidene fluoride-hexafluoropropylene copolymer, styrene-acrylate copolymer, styrene-butadiene copolymer, polyamide, polyacrylonitrile, polyacrylate ester, polyacrylic acid, polyacrylate salt, sodium carboxymethylcellulose, polyvinyl acetate, polyvinylpyrrolidone, polyvinyl ether, polymethyl methacrylate, polytetrafluoroethylene, or polyhexafluoropropylene. The positive electrode active substance includes but is not limited to at least one of lithium cobaltate, lithium nickelate, lithium manganate, lithium nickel manganate, lithium nickel cobaltate, lithium iron phosphate, lithium nickel cobalt aluminate, or lithium nickel cobalt manganate. The foregoing positive electrode active substance may be doped or coated.

In some embodiments, the separator 11 includes at least one of polyethylene, polypropylene, polyvinylidene fluoride, polyethylene terephthalate, polyimide, or aramid. For example, polyethylene is selected from at least one of high-density polyethylene, low-density polyethylene, or ultra-high molecular weight polyethylene. Particularly, polyethylene and polypropylene can well prevent short circuit, and can improve stability of a battery through a shutdown effect.

In some embodiments, a surface of the separator may further include a porous layer. The porous layer is disposed on at least one surface of the separator and includes inorganic particles and a binder, where the inorganic particles are selected from at least one of aluminum oxide ($Al_2O_3$), silicon dioxide ($SiO_2$), magnesium oxide (MgO), titanium oxide ($TiO_2$), hafnium dioxide ($HfO_2$), stannic oxide ($SnO_2$), cerium dioxide ($CeO_2$), nickel oxide (NiO), zinc oxide (ZnO), calcium oxide (CaO), zirconium dioxide ($ZrO_2$), yttrium oxide ($Y_2O_3$), silicon carbide (SiC), boehmite, aluminum hydroxide, magnesium hydroxide, calcium hydroxide, or barium sulfate. The binder is selected from at least one of polyvinylidene fluoride, vinylidene fluoride-hexafluoropropylene copolymer, polyamide, polyacrylonitrile, polyacrylate ester, polyacrylic acid, polyacrylate salt, sodium carboxymethylcellulose, polyvinylpyrrolidone, polyvinyl ether, polymethyl methacrylate, polytetrafluoroethylene, or polyhexafluoropropylene. The porous layer on the surface of the separator can improve heat resistance, oxidation resistance, and electrolyte infiltration performance of the separator, and enhance adhesion between the separator and the electrode plates.

In some embodiments, the negative electrode plate 12 may be the negative electrode plate described above.

In some embodiments of this application, an electrode assembly of the electrochemical apparatus is a wound electrode assembly or a stacked electrode assembly.

In some embodiments, the electrochemical apparatus includes a lithium-ion battery, but this applicant is not limited thereto. For example, the electrochemical apparatus may further include an electrolyte. In some embodiments, the electrolyte includes at least two of dimethyl carbonate (DMC), ethyl methyl carbonate (EMC), diethyl carbonate (DEC), ethylene carbonate (EC), propylene carbonate (PC), or propyl propionate (PP). In addition, the electrolyte may further additionally include at least one of vinylene carbonate (VC), fluoroethylene carbonate (FEC), or dinitrile compound serving as an electrolyte additive.

In some embodiments of this application, a lithium-ion battery is used as an example. A positive electrode plate, a separator, and a negative electrode plate are wound or stacked in sequence to form an electrode assembly, and then the electrode assembly is placed into, for example, an aluminum-plastic film, for packaging, followed by injection of an electrolyte, formation, and packaging, so that the lithium-ion battery is prepared. Then, performance and cycling tests are performed on the prepared lithium-ion battery.

Persons skilled in the art will understand that the preparation method of electrochemical apparatus (for example, lithium-ion battery) described above is only an embodiment. Without departing from the content disclosed in this application, other methods commonly used in the art may be used.

An embodiment of this application further provides an electronic apparatus including the foregoing electrode assembly or an electronic apparatus including the foregoing electrochemical apparatus. In some embodiments, the electronic apparatus in this application is not particularly limited, and may be any known electronic apparatus used in the prior art. In some embodiments, the electronic apparatus may include but is not limited to a notebook computer, a pen-input computer, a mobile computer, an electronic book player, a portable telephone, a portable fax machine, a portable copier, a portable printer, a stereo headset, a video recorder, a liquid crystal television, a portable cleaner, a portable CD player, a mini-disc, a transceiver, an electronic notepad, a calculator, a memory card, a portable recorder, a radio, a standby power source, a motor, an automobile, a motorcycle, a power-assisted bicycle, a bicycle, a lighting appliance, a toy, a game console, a clock, an electric tool, a flash lamp, a camera, a large household battery, and a lithium-ion capacitor.

Some specific examples and comparative examples are listed below to better describe this application. Lithium-ion batteries are used as examples.

Example 1

Preparation of negative electrode material: 5 g of carbon nanotube powder was added into a solvent containing 3 g sodium anthranilate (containing carboxyl group and phenylamino group), and the mixture was dispersed for 10 h to obtain a carbon nanotube slurry; 92 g of SiO particles (with a value of $I_2/I_1$ being 0.38) was added into the carbon nanotube slurry, and the mixture was stirred at a rotation speed of 2000 r/min and dispersed for 4 h; the mixed slurry was dried, and the solvent in the mixed slurry was removed to obtain a composite; and the composite was mechanically crushed and sieved with a 400-mesh sieve to obtain a negative electrode material coated with carbon nanotubes and a polymer.

Preparation of negative electrode plate: copper foil with a thickness of 10 μm was used as a current collector; the foregoing silicon-based material and graphite were used as an active material, where a mass percentage of the silicon-based material in an active material layer was 10%; polyacrylic acid was used as a binder; and the active material, conductive carbon black, and binder were mixed at 95:1.2:3.8 and dispersed in water to form a slurry, and the slurry was stirred and then applied onto the copper foil, followed by drying, cold pressing, and slitting to obtain a negative electrode plate.

Preparation of positive electrode plate: a positive electrode active substance $LiCoO_2$, conductive carbon black, and a binder polyvinylidene fluoride (PVDF) were fully stirred and uniformly mixed in an N-methylpyrrolidone solvent system at a mass ratio of 96.7:1.7:1.6, and then the mixture was applied onto an aluminum foil, followed by drying and cold pressing to obtain a positive electrode plate.

Preparation of battery: with a polyethylene porous polymer thin film as a separator, the positive electrode plate, the separator, and the negative electrode plate were stacked in sequence, so that the separator was placed between the positive electrode plate and negative electrode plate for isolation, and the stack was wound to obtain an electrode assembly. The electrode assembly was placed into an outer package aluminum-plastic film, and an electrolyte containing ethylene carbonate (EC) and propylene carbonate (PC) was injected, followed by processes such as packaging, formation, degassing, and trimming to obtain a lithium-ion battery.

In Examples 2 to 22 and Comparative Examples 1 to 3, except for the preparation of the negative electrode materials in the negative electrode plates, the preparation of the positive electrode plates and lithium-ion batteries was the same as that in Example 1. The following describes only differences in the preparation of the negative electrode materials respectively. In Examples 2 to 6 and Comparative Example 1, the types of the polymers were changed to epoxy resin (containing hydroxyl group and epoxy group), lithium carboxymethyl cellulose (containing only carboxyl group), polyethylene glycol (containing only hydroxyl group), polyaniline (containing only phenylamino group), polysiloxane (containing only epoxy group), and polyethylene (containing no group A or group B) respectively.

In Examples 7 to 10 and Comparative Example 2, the weights of the polymers were changed to 1 g, 5 g, 10 g, 20 g, and 0 g respectively, and the weights of the particles of the silicon-based materials were changed to 94 g, 90 g, 85 g, 75 g, and 95 g correspondingly.

In Examples 11 to 14 and Comparative Example 3, the weights of the carbon nanotubes were changed to 1 g, 3 g, 10 g, 20 g, and 0 g respectively, and the weights of the particles of the silicon-based materials were changed to 96 g, 94 g, 87 g, 77 g, and 97 g correspondingly.

In Examples 15 to 18, the values of $I_2/I_1$ of the particles of the silicon-based materials were changed to 0.41, 0.64, 1, and 2.5 respectively, and others remained the same.

In Examples 19 to 22, the equivalent trace doping metal elements lithium, magnesium, titanium, and aluminum were added into the negative electrode materials respectively, and others remained the same.

Processes for measuring various parameters in the examples and comparative examples are as follows.

Charge and discharge test:

The negative electrode material, conductive carbon black, and a binder polyacrylic acid (PAA) were added into deionized water at a mass ratio of 80:10:10, and stirred to form a slurry. The slurry was applied with a scraper to form a 100 μm thick coating layer. The coating layer was dried in a vacuum drying oven for 12 hours at 85° C., and then cut into a circular plate with a diameter of 1 cm in a dry environment by using a punching machine. A lithium metal plate was used as a counter electrode in a glove box, a Ceglard composite film was selected as a separator, and an electrolyte was added, to assemble a button battery. A LAND (LAND) battery tester was used to conduct charge and discharge tests on the batteries to test their charge and discharge performance.

Electronic Conductivity Test:

A four-wire and two-terminal method was used. Voltages and flowing current at two terminals of a to-be-tested resistor were measured to determine constant resistance, and conductivity was calculated with reference to a height and a bottom area of the to-be-tested resistor. A given amount of powder was added into a test mold and laid flat through slight vibration, and then a spacer on the mold was placed on a sample; after the sample was loaded, the mold was placed on a working platform of an electronic pressure testing machine, and pressure was increased to 500 kg (159 MPa) at a rate of 5 mm/min, held for 60s and then reduced to 0; and when a constant pressure on the sample reached 5000±2 kg (about 15s-25s after the pressure was increased to 5000 kg), the pressure on the sample was recorded, deformation height of the sample was read, a value displayed on a resistance tester at this time was recorded, and then the electronic conductivity was calculated by using a formula.

X-Ray Diffraction (XRD) Test:

1.0 g-2.0 g of sample was weighted, poured into a groove of a glass sample holder, and compacted and smoothed with a glass sheet. Then, the sample was tested by using an X-ray diffractometer (Brook, D8) according to JJS K 0131-1996 "General Principles of X-Ray Diffraction Analysis", with a test voltage set to 40 kV, a current to 30 mA, a scanning angle range to 10°-85°, a scanning step to 0.0167°, and a time for each step to 0.24 s. Then, an XRD diffraction pattern was obtained from which a highest intensity value $I_2$ when 2θ was 28.4° and a highest intensity value $I_1$ when 2θ was 21.0° were obtained. Then, a value of $I_2/I_1$ was calculated.

Battery Cycling Performance Test:

At a test temperature of 45° C., the batteries were charged to 4.4 V at a constant current of 0.7 C, then charged to 0.025 C at a constant voltage, left standing for 5 minutes, and then discharged to 3.0 V at 0.5 C. A capacity obtained in this step was an initial capacity, and then a 0.7 C charge/0.5 C discharge cycle test was performed. A ratio of a capacity in each step to the initial capacity was calculated to obtain a capacity attenuation curve, and the number of cycles where the capacity dropped to 80% of the initial capacity was counted.

Direct Current Resistance (DCR) Test:

An actual capacity of the electrode assembly was tested with a Maccor machine at 25° C. (charged to 4.4 V at a constant current of 0.7 C, charged to 0.025 C at a constant voltage, left standing for 10 minutes, discharged to 3.0 V at 0.1 C, and left standing for 5 minutes). The electrode assembly was discharged to specific states of charge (SOC) at 0.1 C. The discharge test was performed for 1 s with a sample collected every 5 ms, and DCR values at different SOCs were calculated.

The following describes the parameter settings and performance results in the examples and comparative examples. Table 1 shows the parameter settings in Examples 1 to 6 and Comparative Example 1, and Table 2 shows the electronic conductivity of the negative electrode materials, the first-cycle coulombic efficiency of the batteries, and the cycling performance and DCRs of the electrochemical apparatuses.

TABLE 1

|  | Polymer group A (substitution degree 1) | Polymer group B (substitution degree 1) | Percentage of polymer (wt %) | Percentage of carbon nanotubes (wt %) |
|---|---|---|---|---|
| Example 1 | Carboxyl group | Phenylamino group | 3 | 5 |
| Example 2 | Hydroxyl group | Epoxy group | 3 | 5 |
| Example 3 | Carboxyl group | N/A | 3 | 5 |
| Example 4 | Hydroxyl group | N/A | 3 | 5 |
| Example 5 | N/A | Phenylamino group | 3 | 5 |
| Example 6 | N/A | Epoxy group | 3 | 5 |
| Comparative Example 1 | N/A | N/A | 3 | 5 |

TABLE 2

|  | Electronic conductivity (S/cm) | First-cycle coulombic efficiency of battery (%) | Cycles where full cell capacity drops to 80% at 45° C. | DCR (mΩ, 10% SOC) |
|---|---|---|---|---|
| Example 1 | 95 | 85.6 | 922 | 55 |
| Example 2 | 93 | 85.2 | 907 | 58 |
| Example 3 | 74 | 80.3 | 831 | 70 |
| Example 4 | 73 | 79.9 | 823 | 74 |
| Example 5 | 77 | 80.5 | 826 | 73 |
| Example 6 | 71 | 79.4 | 818 | 75 |
| Comparative Example 1 | 66 | 75.1 | 703 | 89 |

Figure 6:
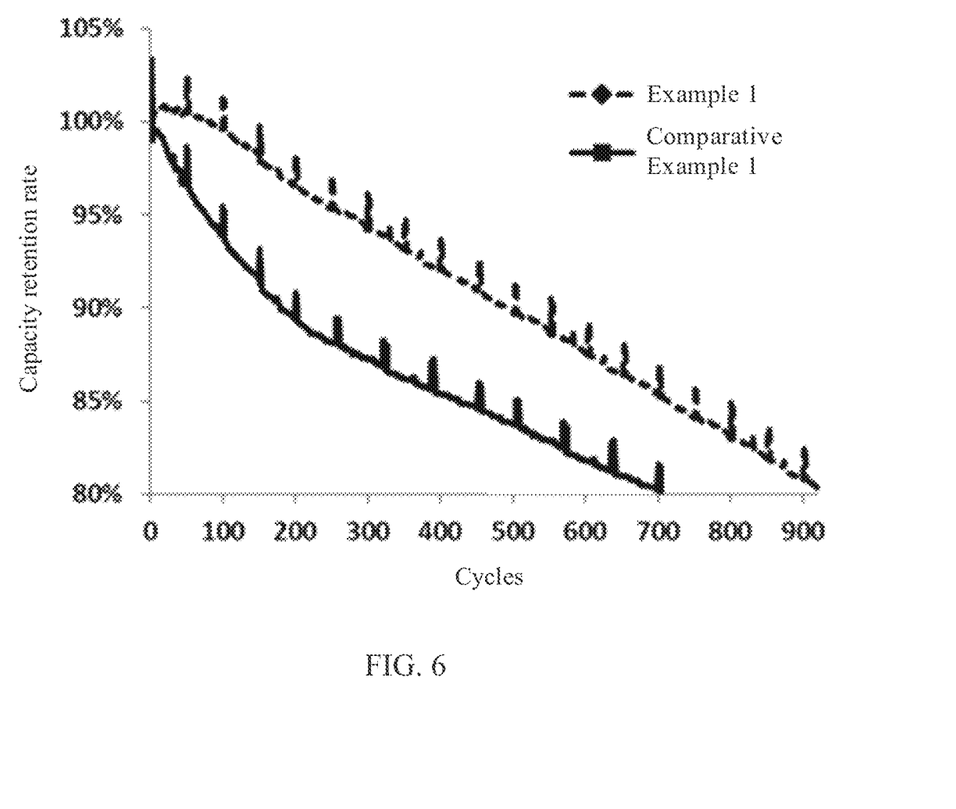
FIG. 6 shows cycling curves in Example 1 and Comparative Example 1.

According to comparison between Examples 1 to 6 and Comparative Example 1, compared with the polymer without the group A and the group B, when the polymers contained both the group A and the group B, the electronic conductivity of the negative electrode materials, the first-cycle coulombic efficiency of the batteries, and the cycling performance of the electrochemical apparatuses were greatly improved, and the DCRs of the electrochemical apparatuses were also much better. This is because the presence of the two groups allowed the carbon nanotubes and the particles of the silicon-based materials to be bonded more tightly and distributed more evenly, thereby effectively improving conductive performance and cycling stability of the silicon-based materials. However, when the polymers contained only the group A or the group B, the electronic conductivity of the negative electrode materials, the first-cycle coulombic efficiency of the batteries, and the cycling performance and DCRs of the electrochemical apparatuses, though improved, were not as good as those when the polymers contained both the group A and the group B. This is because the carbon nanotubes and the particles of the silicon-based materials were not bonded tightly. FIG. 6 shows cycling curves in Example 1 and Comparative Example 1. Under the same number of cycles, the capacity retention rate in Example 1 was greater.

Table 3 shows the parameter settings in Examples 1 and 7 to 10 and Comparative Example 2, and Table 4 shows the electronic conductivity of the negative electrode materials, the first-cycle coulombic efficiency of the batteries, and the cycling performance and DCRs of the electrochemical apparatuses.

TABLE 3

| | Polymer group A (substitution degree 1) | Polymer group B (substitution degree 1) | Percentage of polymer (wt %) | Percentage of carbon nanotubes (wt %) |
|---|---|---|---|---|
| Example 1 | Carboxyl group | Phenylamino group | 3 | 5 |
| Example 7 | Carboxyl group | Phenylamino group | 0.5 | 5 |
| Example 8 | Carboxyl group | Phenylamino group | 5 | 5 |
| Example 9 | Carboxyl group | Phenylamino group | 10 | 5 |
| Example 10 | Carboxyl group | Phenylamino group | 20 | 5 |
| Comparative Example 2 | Carboxyl group | Phenylamino group | 0 | 5 |

TABLE 4

| | Electronic conductivity (S/cm) | First-cycle coulombic efficiency of battery (%) | Cycles where full cell capacity drops to 80% at 45° C. | DCR (mΩ, 10% SOC) |
|---|---|---|---|---|
| Example 1 | 95 | 85.6 | 922 | 55 |
| Example 7 | 87 | 80.2 | 884 | 61 |
| Example 8 | 94 | 84.3 | 901 | 57 |
| Example 9 | 86 | 77.9 | 866 | 64 |
| Example 10 | 72 | 74.5 | 815 | 76 |
| Comparative Example 2 | 68 | 73.4 | 804 | 77 |

According to comparison between Examples 1 and 7 to 10 and Comparative Example 2, when the polymers contained both the group A and the group B and the percentages of the carbon nanotubes were the same, the percentages of the polymers also affected the performance of the negative electrode materials to some extent. An excessively low percentage of the polymer cannot effectively enhance the bonding between the particles of the silicon-based material and the carbon nanotubes, such that the electronic conductivity of the negative electrode material, the first-cycle coulombic efficiency of the battery, and the cycling performance and DCR of the electrochemical apparatus cannot be effectively improved. An excessively high percentage of the polymer can effectively enhance the bonding between the particles of the silicon-based material and the carbon nanotubes through the two groups, but reduces the electronic conductivity of the negative electrode material due to poor conductive performance of the polymer, such that the first-cycle coulombic efficiency of the battery, the cycling performance and DCR of the electrochemical apparatus, and the like cannot be effectively improved.

Table 5 shows the parameter settings in Examples 1 and 11 to 14 and Comparative Example 3, and Table 6 shows the electronic conductivity of the negative electrode materials, the first-cycle coulombic efficiency of the batteries, and the cycling performance and DCRs of the electrochemical apparatuses.

TABLE 5

| | Polymer group A (substitution degree 1) | Polymer group B (substitution degree 1) | Percentage of polymer (wt %) | Percentage of carbon nanotubes (wt %) |
|---|---|---|---|---|
| Example 1 | Carboxyl group | Phenylamino group | 3 | 5 |
| Example 11 | Carboxyl group | Phenylamino group | 3 | 0.5 |
| Example 12 | Carboxyl group | Phenylamino group | 3 | 3 |
| Example 13 | Carboxyl group | Phenylamino group | 3 | 10 |
| Example 14 | Carboxyl group | Phenylamino group | 3 | 20 |
| Comparative Example 3 | Carboxyl group | Phenylamino group | 3 | 0 |

TABLE 6

| | Electronic conductivity (S/cm) | First-cycle coulombic efficiency of battery (%) | Cycles where full cell capacity drops to 80% at 45° C. | DCR (mΩ, 10% SOC) |
|---|---|---|---|---|
| Example 1 | 95 | 85.6 | 922 | 55 |
| Example 11 | 14 | 80.5 | 854 | 63 |
| Example 12 | 55 | 84.4 | 881 | 58 |
| Example 13 | 112 | 85.7 | 903 | 54 |
| Example 14 | 236 | 85.9 | 894 | 53 |
| Comparative Example 3 | 6 | 73.7 | 808 | 78 |

According to comparison between Examples 1 and 11 to 14 and Comparative Example 3, when the polymers contained both the group A and the group B and the percentages of the polymers were the same, as the percentages of the carbon nanotubes increased, the conductive performance of the negative electrode materials, the first-cycle coulombic efficiency of the batteries, and the DCRs of the electrochemical apparatuses tended to be better, but the cycling performance of the electrochemical apparatuses tended to be better and then worsen. That means when the percentages of the carbon nanotubes were excessively high, coating layers were too thick, which was not conducive to migration of lithium ions, thereby deteriorating the cycling performance of the electrochemical apparatuses.

Figure 5:
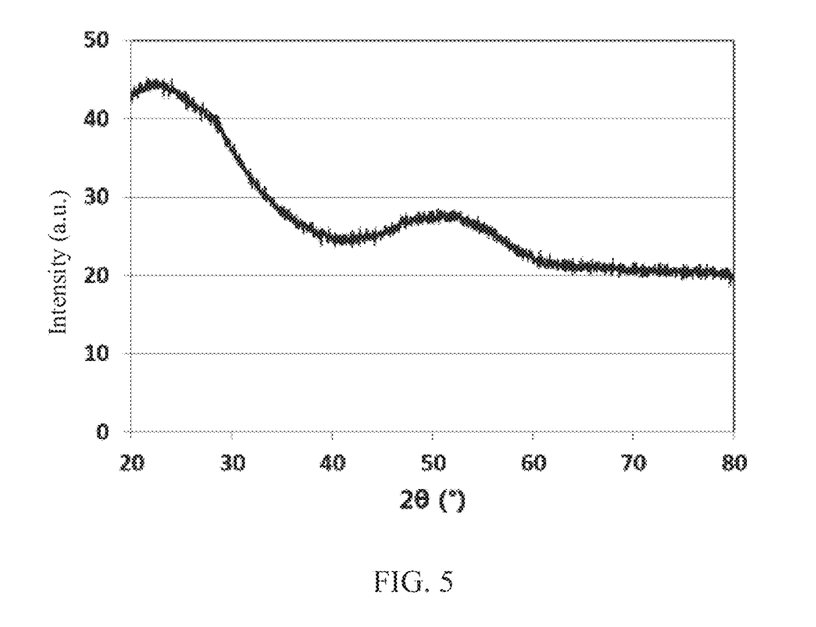
FIG. 5 is an X-ray diffraction pattern of particles of a silicon-based material in Example 1.

Table 7 shows the parameter settings in Examples 1 and 15 to 18, and Table 8 shows the electronic conductivity of the negative electrode materials, the first-cycle coulombic efficiency of the batteries, and the cycling performance and DCRs of the electrochemical apparatuses. FIG. 5 is an X-ray diffraction pattern of particles of a silicon-based material in Example 1.

TABLE 7

|  | Polymer group A (substitution degree 1) | Polymer group B (substitution degree 1) | Percentage of polymer (wt %) | Percentage of carbon nanotubes (wt %) | $I_2/I_1$ |
|---|---|---|---|---|---|
| Example 1 | Carboxyl group | Phenylamino group | 3 | 5 | 0.38 |
| Example 15 | Carboxyl group | Phenylamino group | 3 | 5 | 0.41 |
| Example 16 | Carboxyl group | Phenylamino group | 3 | 5 | 0.64 |
| Example 17 | Carboxyl group | Phenylamino group | 3 | 5 | 1 |
| Example 18 | Carboxyl group | Phenylamino group | 3 | 5 | 2.5 |

TABLE 8

|  | Electronic conductivity (S/cm) | First-cycle coulombic efficiency of battery (%) | Cycles where full cell capacity drops to 80% at 45° C. | DCR (mΩ, 10% SOC) |
|---|---|---|---|---|
| Example 1 | 95 | 85.6 | 922 | 55 |
| Example 15 | 94 | 84.4 | 904 | 53 |
| Example 16 | 95 | 83.7 | 879 | 57 |
| Example 17 | 92 | 83.9 | 856 | 55 |
| Example 18 | 96 | 84.6 | 823 | 54 |

According to comparison among Examples 1 and 15 to 18, when the polymers contained both the group A and the group B and the percentages of the polymers and the percentages of the carbon nanotubes were the same, the conductive performance of the negative electrode materials, the first-cycle coulombic efficiency of the batteries, and the DCRs of the electrochemical apparatuses were approximately the same. However, as the values of $I_2/I_1$ of the silicon-based materials increased, the cycling performance of the electrochemical apparatuses was reduced continuously. A value of $I_2/I_1$ reflects to what extent the silicon-based material is affected by disproportionation. A larger value of $I_2/I_1$ means larger nano-silicon crystal grains generated by SiO disproportionation generated in the silicon-based material, which leads to sharply increased stress on some regions during lithiation, thereby causing structural damage to the silicon-based material during cycling.

Table 9 shows the parameter settings in Examples 1 and 19 to 22, and Table 10 shows the electronic conductivity of the negative electrode materials, the first-cycle coulombic efficiency of the batteries, and the cycling performance and DCRs of the electrochemical apparatuses.

TABLE 9

|  | Polymer group A (substitution degree 1) | Polymer group B (substitution degree 1) | Percentage of polymer (wt %) | Percentage of carbon nanotubes (wt %) | Type of doping element |
|---|---|---|---|---|---|
| Example 1 | Carboxyl group | Phenylamino group | 3 | 5 | N/A |
| Example 19 | Carboxyl group | Phenylamino group | 3 | 5 | Lithium |
| Example 20 | Carboxyl group | Phenylamino group | 3 | 5 | Magnesium |
| Example 21 | Carboxyl group | Phenylamino group | 3 | 5 | Titanium |
| Example 22 | Carboxyl group | Phenylamino group | 3 | 5 | Aluminum |

TABLE 10

|  | Electronic conductivity (S/cm) | First-cycle coulombic efficiency of battery (%) | Cycles where full cell capacity drops to 80% at 45° C. | DCR (mΩ, 10% SOC) |
|---|---|---|---|---|
| Example 1 | 95 | 85.6 | 922 | 55 |
| Example 19 | 135 | 88.4 | 981 | 37 |

TABLE 10-continued

|  | Electronic conductivity (S/cm) | First-cycle coulombic efficiency of battery (%) | Cycles where full cell capacity drops to 80% at 45° C. | DCR (mΩ, 10% SOC) |
|---|---|---|---|---|
| Example 20 | 130 | 88.3 | 978 | 38 |
| Example 21 | 136 | 88.5 | 984 | 36 |
| Example 22 | 133 | 88.4 | 975 | 38 |

According to comparison between Examples 1 and 19 to 22, when the polymers contained both the group A and the group B and the percentages of the polymers and the percentages of the carbon nanotubes were the same, the doping metal elements in the negative electrode materials improved the conductive performance of the negative electrode materials, the first-cycle coulombic efficiency of the batteries, and the cycling performance and DCRs of the electrochemical apparatuses. Type differences in the doping metal elements only made a small difference to such performance.

The foregoing descriptions are only preferred examples of this application and explanations of the applied technical principles. Persons skilled in the art should understand that the scope of disclosure involved in this application is not limited to the technical solutions formed by the specific combination of the above technical features and should also cover other technical solutions formed by any combination of the above technical features or their equivalent features without departing from the above disclosed concept, for example, a technical solution formed by replacement between the foregoing features and technical features having similar functions disclosed in this application.

What is claimed is:

1. A negative electrode material, comprising:
   a composite of a silicon-based material, a polymer and carbon nanotubes;
   wherein the polymer contains a first group and a second group, the first group is chemically bonded to the carbon nanotubes, and the second group is chemically bonded to the silicon-based material, a mass percentage of the polymer in the composite is 0.5%-5%, a mass percentage of the carbon nanotubes in the composite is 5%-10%, and in an X-ray diffraction pattern of the negative electrode material, a highest intensity value of the silicon-based material is $I_1$ when $2\theta$ is in the range of 20.5° to 21.5°, and the highest intensity value is $I_2$ when $2\theta$ is in the range of 28.0° to 29.0°, wherein $0.38 < I_2/I_1 \leq 1$.

2. The negative electrode material according to claim 1, wherein the carbon nanotubes are present on a surface of the silicon-based material.

3. The negative electrode material according to claim 1, wherein the first group comprises at least one of epoxy group, phenolic hydroxyl group, phenylamino group, phenyl group, naphthyl group, anthranyl group, phenanthryl group, phenyl ether group, pyrrole, pyridine, or furan.

4. The negative electrode material according to claim 1, wherein the second group comprises at least one of carboxyl group, hydroxyl group, phenolic hydroxyl group, aldehyde group, acylamino group, acyl halide group, ester group, carbonyl group, or halogenated alkyl group.

5. The negative electrode material according to claim 1, wherein a mass percentage of the polymer in the composite is 0.5%-5%.

6. The negative electrode material according to claim 1, wherein a mass percentage of the carbon nanotubes in the composite is 0.5%-5%.

7. The negative electrode material according to claim 1, wherein a mass ratio of the silicon-based material to the polymer to the carbon nanotubes in the composite is 85-96.5:0.5-10:0.5-10.

8. The negative electrode material according to claim 1, wherein the negative electrode material is further doped with at least one element selected from the group consisting of lithium, magnesium, titanium and aluminum.

9. An electrochemical apparatus, comprising:
a positive electrode plate;
a negative electrode plate; and
a separator disposed between the positive electrode plate and the negative electrode plate;
wherein the negative electrode plate comprises a negative electrode material;

the negative electrode material comprises a composite of a silicon-based material, a polymer and carbon nanotubes;

wherein the polymer contains a first group and a second group, the first group is chemically bonded to the carbon nanotubes, and the second group is chemically bonded to the silicon-based material, a mass percentage of the polymer in the composite is 0.5%-5%, a mass percentage of the carbon nanotubes in the composite is 5%-10%, and in an X-ray diffraction pattern of the negative electrode material, a highest intensity value of the silicon-based material is $I_1$ when $2\theta$ is in the range of 20.5° to 21.5°, and the highest intensity value is $I_2$ when $2\theta$ is in the range of 28.0° to 29.0°, wherein $0.38 < I_2/I_1 \leq 1$.

10. The electrochemical apparatus according to claim 9, wherein a mass percentage of the polymer in the composite is 0.5%-5%.

11. The electrochemical apparatus according to claim 9, wherein a mass percentage of the carbon nanotubes in the composite is 0.5%-5%.

12. An electronic apparatus, comprising the electrochemical apparatus according to claim 9.

13. The negative electrode material according to claim 1, wherein the polymer comprises one or two groups selected from hydroxyl group, epoxy group, carboxyl group and phenylamino group.

14. The negative electrode material according to claim 1, wherein the mass percentage of the polymer in the composite is 0.5%-3%.

15. The electrochemical apparatus according to claim 9, wherein the polymer comprises one or two groups selected from hydroxyl group, epoxy group, carboxyl group and phenylamino group.

16. The electrochemical apparatus according to claim 9, wherein the mass percentage of the polymer in the composite is 0.5%-3%.

* * * * *